May 12, 1936.                B. A. WILSON                2,040,230
                        ROLL NECK MILLING MACHINE
                    Filed Oct. 4, 1932        5 Sheets-Sheet 1
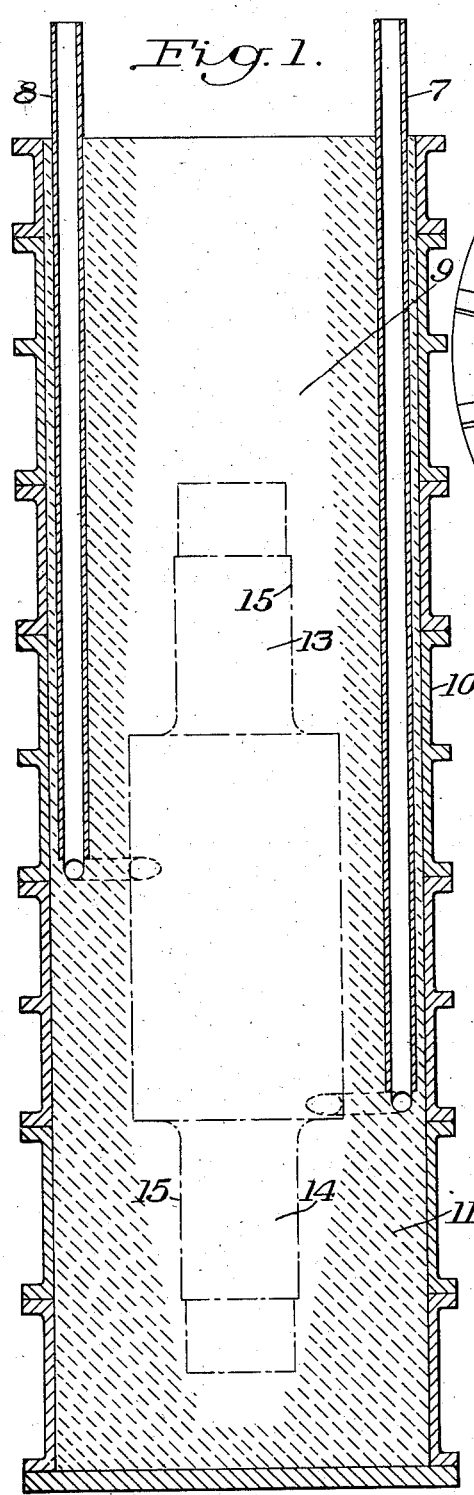
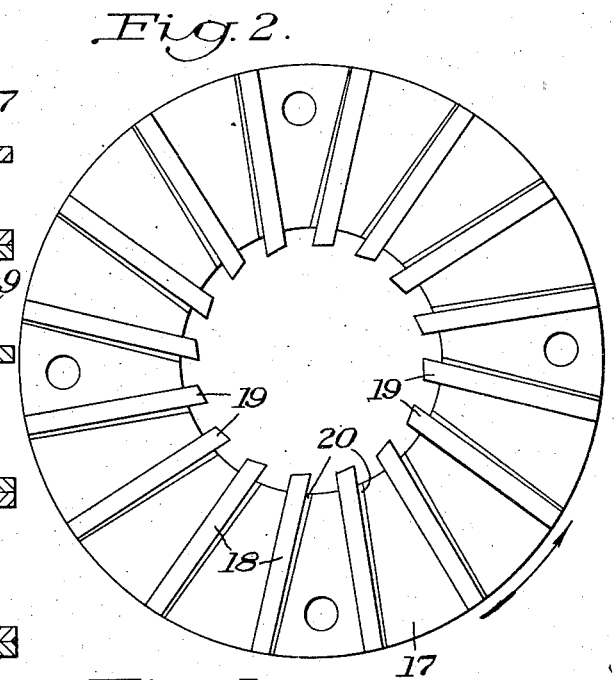
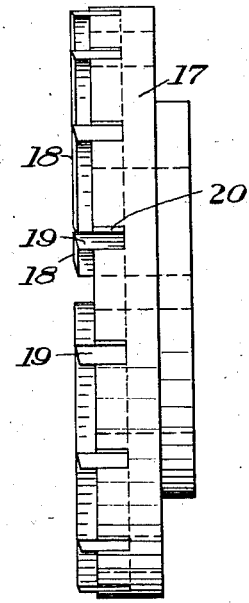
INVENTOR
Bert A. Wilson
by
Byrnes, Stebbins, Parmelee & Blenko
his attorneys

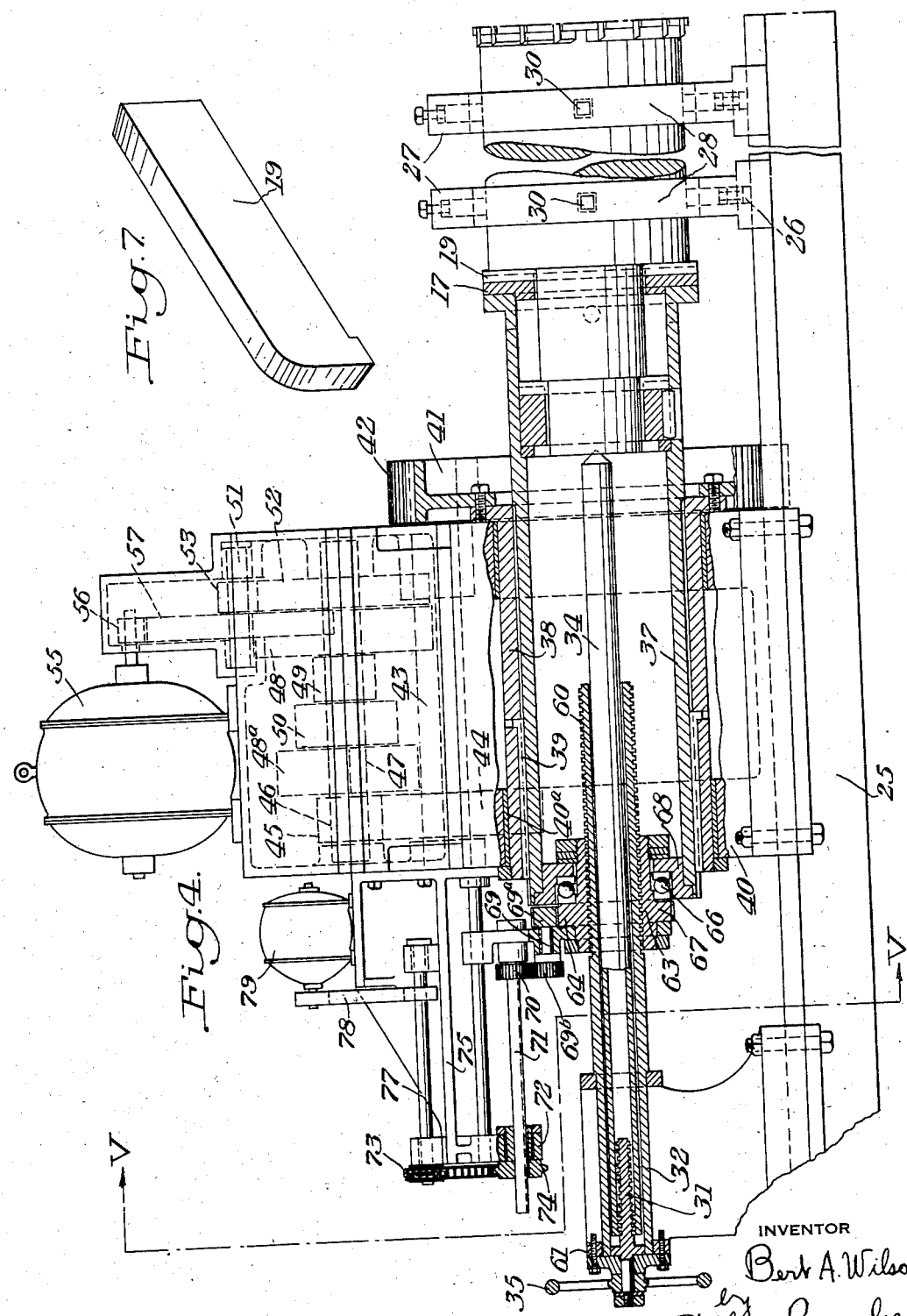

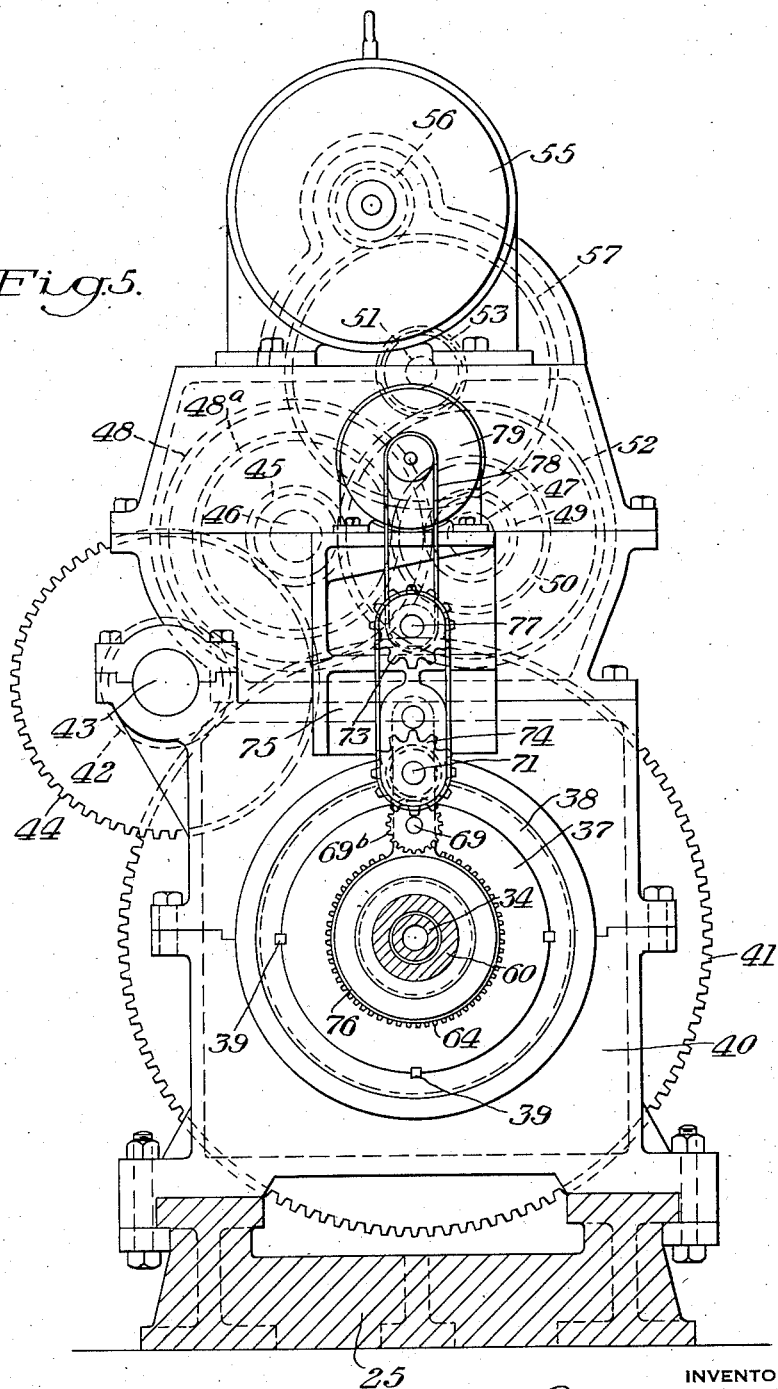

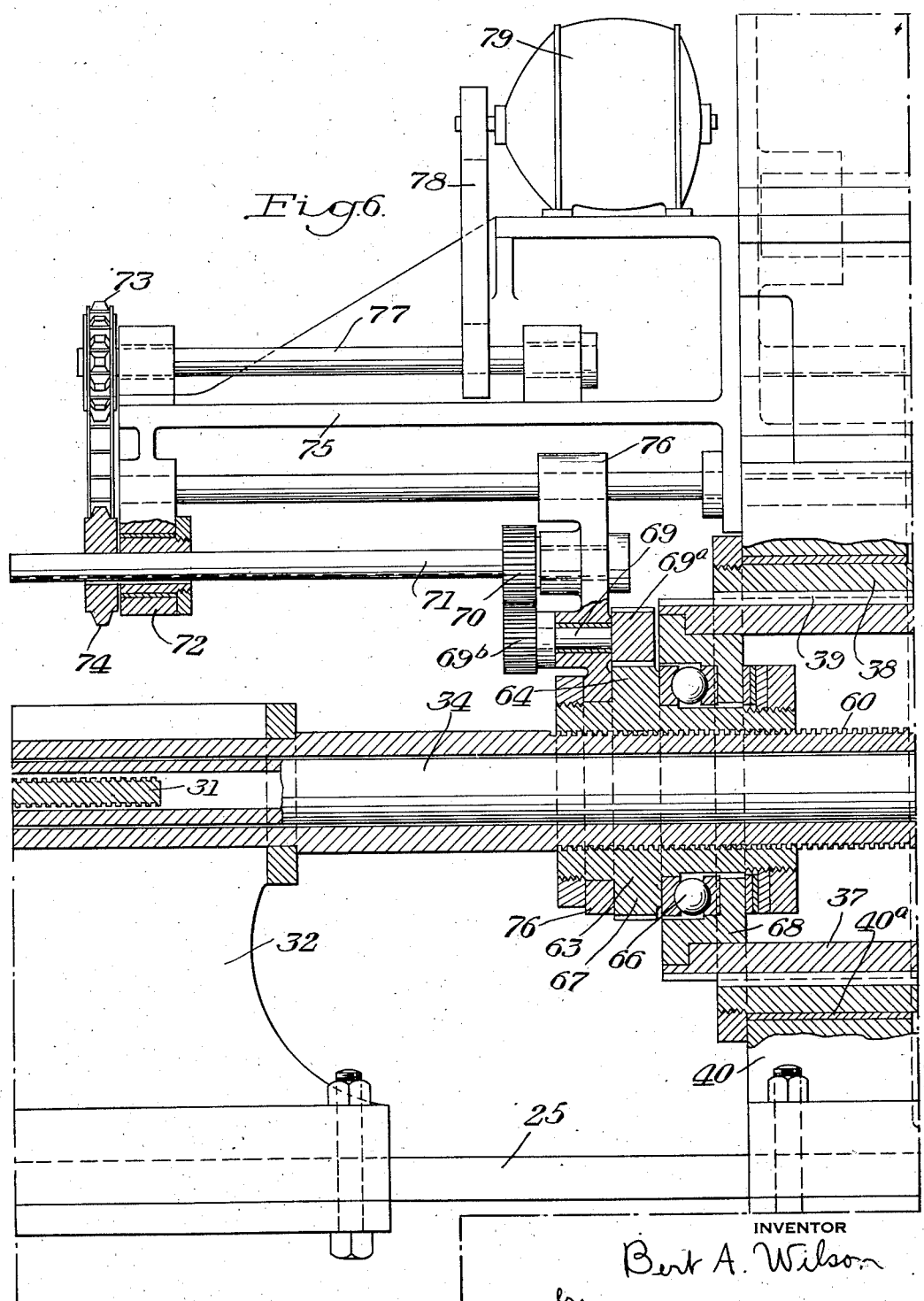

May 12, 1936.  B. A. WILSON  2,040,230
ROLL NECK MILLING MACHINE
Filed Oct. 4, 1932   5 Sheets-Sheet 5

INVENTOR
Bert A. Wilson
by Byrnes, Stebbins
Parmelee & Blenko
his attorneys

Patented May 12, 1936

2,040,230

UNITED STATES PATENT OFFICE 2,040,230

ROLL NECK MILLING MACHINE

Bert A. Wilson, Pittsburgh, Pa., assignor to Pittsburgh Rolls Corporation, Pittsburgh, Pa., a corporation of Virginia Application October 4, 1932, Serial No. 636,162

4 Claims. (Cl. 90—14)

This invention relates to the manufacture of articles which are to include a neck or similarly shaped portion. My invention has certain advantages, more particularly with relation to the machining of rolls for use in rolling mills.

Rolls for rolling mills must be very strong, sound throughout, hard, so as to resist denting and roughening, and must have a true outer surface. In order to obtain an article of the proper quality, rolls have, in the past, been made of such materials as are exceedingly hard when cast and very difficult to machine. Special alloys have, in certain instances, been employed in the production of rolls for rolling mills.

By my improvement in method of machining the roll necks, it is possible to cut with a plurality of tools simultaneously, and the thickness of metal removed by each tool is so slight that there is practically no danger of over-heating of the tool. On the other hand, each tool removes a thin wide cutting so that the time consumed by the machining operation is substantially reduced.

The cutting tools do not make the cut from the periphery of the roll inwardly but, instead, the cutting edge cuts into an end surface of the work-piece. By thus making a cut by a tool which is forced into an end surface of the work-piece, and by bringing about relative movement between the work-piece and the cutters longitudinally of the axis of the roll, the neck or necks may be rapidly machined.

Preferably, the entire annular zone extending from the outer diameter of the work-piece substantially to the finished diameter of the neck is machined by a single setting of the machine. In other words, the cut is wide enough to remove the entire amount of metal in such zone by relative rotation between the cutter or cutters and the work-piece.

My invention is best carried out in apparatus such as disclosed in the present application, this apparatus being so constructed as to hold the work-piece against turning, and to apply a plurality of cutters for machining the neck or the necks of the roll. The cutters are rotated at a suitable speed such as will most advantageously remove the metal. I prefer because of the large investment involved in plant and machinery to rotate the cutters at high speed, each tool taking a relatively shallow cut. The cuttings are directed endwise of the roll rather than radially, as in the ordinary lathe. The tools are so disposed as to cause the cuttings to free themselves from the tools, thus preventing clogging of the machine by means of the cuttings.

In the accompanying drawings in which for purposes of illustration merely, I have shown one embodiment of my invention:—

Fig. 1 is a central vertical section of a mold showing in dot and dash lines the size of the finished roll as compared with the mold cavity;

Fig. 2 is a face view of the plurality of cutters mounted in a head;

Fig. 3 is a side view of the cutting mechanism shown in Fig. 2;

Fig. 4 is a view partly in side elevation and partly in central vertical section of a lathe for performing the machining of roll necks in accordance with my invention;

Fig. 5 is an end view of the lathe shown in Fig. 4, parts being omitted;

Fig. 6 is a detail view principally in central vertical section of the feed of the lathe;

Fig. 7 is a detail view of a cutting tool or blade;

Figure 9:
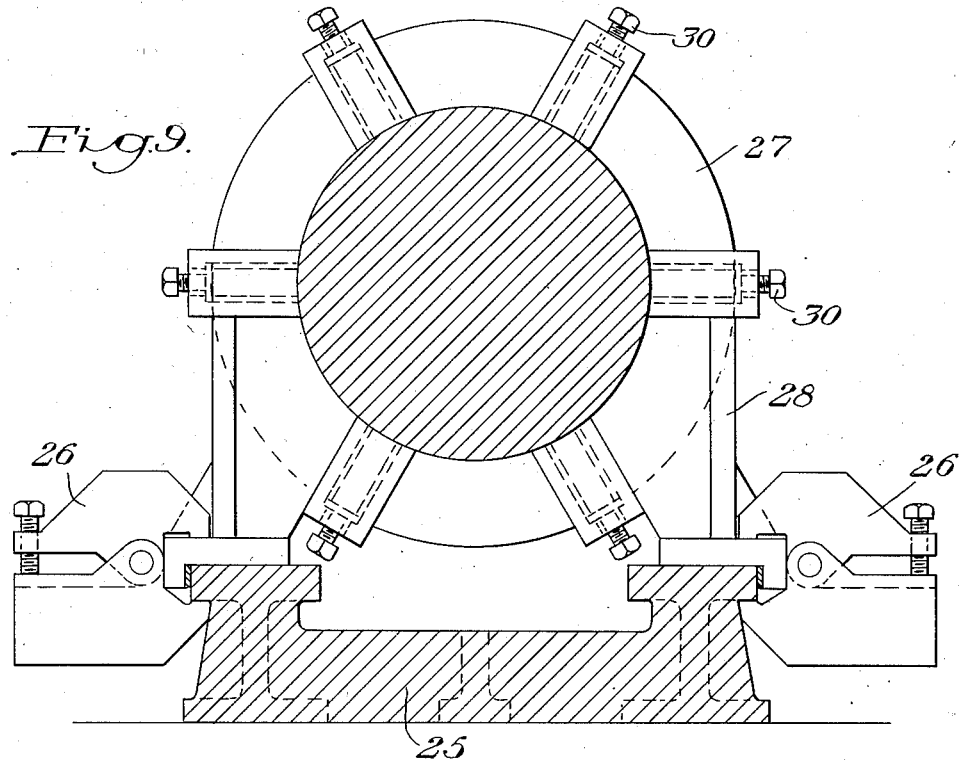
Fig. 9 is an end view of the roll housing for supporting the roll during the turning operation.

This invention relates to the manufacture of rolls for use in rolling mills, or for similar articles having a neck. While certain features of the invention may be employed in other lines of manufacture, the invention is peculiarly adapted to the manufacture of rolls and will be described in connection therewith—it being understood that the purpose is not to limit the invention to this particular use but to describe it in connection with the manufacture of rolls as a preferred use.

In casting a roll the long dimension of the casting is vertically disposed, as is apparent from Fig. 1. Metal is poured through spout 7, (more than one such spout 7 being generally employed, although one only is shown in Fig. 1) and then through spout 8 so as to fill a substantial portion of the mold space 9 within the mold 10. The mold cavity 9 within the molding sand 11 is of sufficient vertical dimension to provide a very considerable excess of metal in the head of the roll, as is evident by the size of the finished roll indicated by the dot and dash lines within the mold cavity. For instance, in casting a roll with an effective width of 96 inches, a casting approximately 25 feet 6 inches from top to bottom may be poured. The top is cut off leaving a casting proper which has substantially the desired length of the finished roll.

In machining the necks 13 and 14 of the roll, I remove a thin wide cutting by advancing a cutting tool, such as a blade 19, into an end portion of the roll, feeding the tool longitudinally of the neck. The chips or cuttings are accordingly directed endwise of the roll during cutting. The metal of which such rolls are ordinarily made is exceedingly hard, and requires that what is known as "high speed steel", sintered hard carbide compositions, or other suitable cutting material be used in manufacturing the cutting tool or blade. Otherwise, the tool would be unable to make any cut at all in the hard metal of the roll. The hardness of the metal from which the roll is cast presents the further difficulty that unless a very small amount of metal be cut at a time, the heat generated is excessive and damage is caused the tool. In accordance with my invention, I make a wide cut, and I prefer that the zone of the cut extend from the outer diameter of the work-piece substantially to the finished diameter 15 of the neck. As a further aid to rapid machining of the roll necks, I employ a plurality of the tools or cutting blades 19, mounting them in a rotary chuck 17 as shown in Fig. 2. The blades 19, having once been set in the head 17, remain fixed, and are not displaced radially inward at any stage of the cutting operation. The only feed of the tools is longitudinally of the work-piece.

It will be noted that the several cutters do not extend truly radially with regard to the axis of the head or chuck 17. I prefer that the cutting edges 18 of the several blades 19 shall tend to throw the cuttings away from the axis of the head or chuck 17; and by canting the cutters 19 at a slight angle with respect to a true radius, such a tendency arises. As the several cutters 19 move relative to the end surface of the zone of metal to be removed, the thin ribbon of metal (termed the "cuttings" or "chips") tends to curl and roll up as the tool cuts in beneath it. By setting the tool at a slight angle relative to a true radius, the "cuttings" curl in a direction outwardly from the axis of the roll. The curling tendency just described is aided by the rapid advance of the cutter head, this rapid advance tending to give the tool a top rake, or lip—a very desirable feature in cutting tools. For example, if each tool removes a cutting one sixty-fourth of an inch thick, and if sixteen tools are used, the feed is such as to advance each tool ¼" each complete revolution, thereby forming a basis for the desirable features of top rake or lip tools.

The cutters 19 may be secured in slots in the chuck 17 by means of wedges 20; or the cutters 19 may, if desired, be accurately fitted in these slots so as not to require wedges. The blades 19 are all in the same plane, and during relative rotation between the work-piece and the plurality of blades 19 carried in the head 17, a plurality of thin wide cuttings are removed from the end of the work-piece. The head or chuck 17 is gradually fed axially of the roll neck, so that the roll neck is received within the central opening of the head.

If the space between the blades 19 should become clogged with cuttings, the cutting action would cease. It will be noted that the head 17 is provided with as many tools as can be accommodated when the necessary strength of the parts is taken care of. The amount of metal removed by one rotation of the head 17 depends almost entirely upon the number of cutting blades 19 mounted in the head. One of the features of my invention, therefore, is the disposal of the cutting blades 19 in such a manner as to decrease the tendency of the cuttings to become lodged between blades instead of being thrown outwardly from the head. In this connection it is to be noted that it is important to rotate the head instead of the work, so that as the head rotates and brings the opening between two cutters to a downwardly sloping angle, the cuttings will be discharged.

The space afforded for the accumulation of chips is, as shown in Figs. 2 and 3, a shallow segment bounded on the two sides by the adjacent cutters 19, and having a depth equal to the extent to which the cutters project from the face of the chuck 17. When this space arrives at a portion of the revolution of the chuck where the large end of the space is downwardly directed, the cuttings are discharged. The amount of metal which may be cut in any given revolution is limited by the amount of chips sufficient to fill this space. In the arrangement of the tools in the head 17, the necessity for discharging the cuttings has given rise to two features. In the first place, the chips are, as has been above mentioned, directed endwise of the roll neck during the cutting operation. In the second place, the tools are mounted at an angle with respect to a true radius whereby the cuttings are directed outwardly away from the center of the head or chuck 17.

When the top of the casting has been cut off as has been above described, the ends are given center points, and the casting is then ready to be machined. In Figs. 4, 5 and 6 I have shown a suitable lathe construction for performing the steps of my improved machining process. It is preferable to maintain the work-piece stationary and to rotate the cutting tools about the axis of the roll neck. On a base or bed-plate 25 are secured by bolts or clamps 26 a pair of roll housings 27. Each housing 27 includes a ring-shaped frame 28 large enough to receive within its central opening the work-piece. A plurality of screws 30 extend inwardly toward the center of the ring, thus providing an adjustable clamp for the work-piece. By loosening the screws 30 on one side of the work-piece and tightening up the screws 30 on another side, the position of the axis of the work-piece may, as indicated by the line of the center points, be adjusted so as to bring said axis into alignment with the axis of the chuck 17.

A pair of tail stocks 32 are provided, one at each end of the lathe. Mechanism including a screw 31 cooperates with the elongated spindle 34 of each tail stock to move this spindle along the axis of the chuck 17 to engage the center points in the ends of the work-piece. A hand wheel 35 is provided for actuating the mechanism just referred to for moving the spindle 34 in and out. Inasmuch as the pressure endwise of the work-piece may arise to large proportions, it is important that the tail stock be of sturdy construction so as to take up this end thrust.

The chuck 17 is carried on the end of a cylindrical support or hollow shaft 37. This shaft 37 is slidable longitudinally within a sleeve 38, but is splined thereto as indicated at 39. The sleeve 38 is supported by the latche frame 40. It is apparent, therefore, that as the sleeve 38 is turned, the shaft 37 is forced to revolve with the sleeve, although the shaft 37 may slide longitudinally within the sleeve 38.

Figure 8:
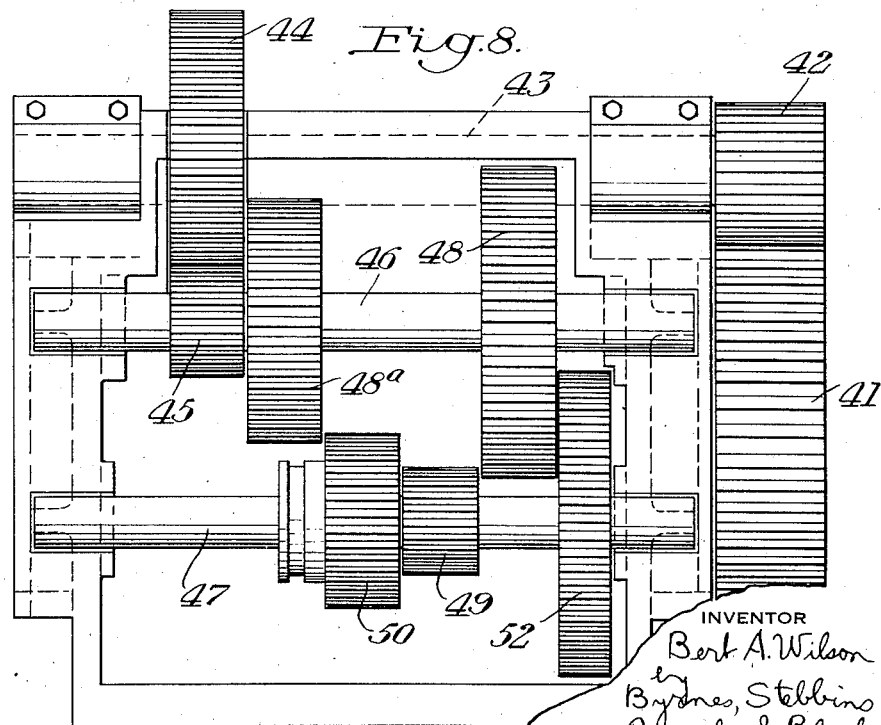
Fig. 8 is a detail view of the change speed gearing for the lathe drive.

As shown in Figs. 4 and 5, the sleeve 38 carries a face-plate gear 41 with which meshes a pinion 42 carried on a shaft 43. At its other end, the shaft 43 carries a gear 44 with which meshes a gear 45. The gear 45 is carried by a shaft 46 which may be driven from a shaft 47 by either of a pair of gear couples alternatively. The gear 48a and a larger gear 48 are secured on the shaft 46 in spaced relation. A pair of gears 49 and 50 are slidable together longitudinally of the shaft 47 by means of shipper mechanism of well known design. The pair of gears 49 and 50 are shown in Fig. 8 in disengaged position which is central and afforded by the spacing of gears 48a and 48. By moving the pair of gears 49 and 50 in one direction or the other along the shaft 47, either the gear 48 will be brought into mesh with the gear 49, or the gear 48a will be brought into mesh with the gear 50. As the gears 49 and 50 are splined to the shaft 47, the latter drives the shaft 46 at a relatively lower or higher speed. The shaft 47 is driven from the shaft 51 by a gear couple consisting of the larger gear 52 and the smaller gear 53. The shaft 51 is driven from the motor 55 which is provided with a motor pinion 56 by means of a gear 57 which meshes with the motor pinion 56. The gear train just described provides a large reduction in speed so that the force with which the shaft 37 is rotated is of a high order.

In order to feed the shaft 37 longitudinally of the roll neck, I provide a screw 60 which surrounds the elongated spindle 34 of the tail stock. A flange 61 on the screw 60 is secured against one end of the tail stock 32, thus taking up the end thrust of the feed for the cutting tools. A nut 63 is threaded on the screw 60, and is provided with an extension constituting a gear 64. A ball bearing 66 is interposed between a flange 67 on the nut 63 and an inwardly extending flange or head 68 within the cylindrical support 37. The sleeve 38 is rotatable in a main bearing 40a in the lathe frame 40. It is apparent, therefore, that if the nut 63 be rotated by the gear 64 so as to be moved longitudinally of the screw 60, the hollow shaft 37 will be fed longitudinally of the axis of the roll neck. The gear 64 is driven by a motor whose speed and direction are under the control of the operator. The gear train includes a gear 69a meshing with the gear 64, this gear 69a being on one end of a counter-shaft 69 whose other end carries a gear 69b. The gear 69b meshes with a gear 70 carried by a shaft 71 which is supported adjacent one of its ends in a bearing 72. A sprocket 74 which is splined to the shaft 71 does not move longitudinally with the cylindrical support 37 as does the shaft 71, but is maintained in alinement with a sprocket 73 by the bearing 72. The bearing 72 is mounted in a bracket which depends from the outer end of a motor support 75. The other end of shaft 71 is journaled in a bearing provided in a bracket 76 which is journaled on and moves longitudinally with the nut 63. The sprocket 73 is driven through shaft 77 and a belt drive 78 from the variable speed reversible motor 79. Thus the drive through the sprocket 74, shaft 71 and gear 64 may be controlled at will to rotate the nut 63 either forwardly or backwardly at a speed determined by the operator.

It is apparent, therefore, that as the motor 55 is actuated, the chuck 17 is rotated in the direction of the arrow shown in Fig. 2; and by suitably driving the nut 63 in clockwise direction (looking from the left end of Fig. 4), the cutters are rotated about the axis of the roll neck, and the chuck 17 is slowly fed longitudinally of the axis of said neck.

The cutting operation gives rise to high torque; and I prefer to machine both necks of the roll at the same time, rotating one chuck 17 in one direction and the other chuck in the opposite direction, thus balancing to a large extent the torques.

If, as is indicated in the drawings, a portion of each neck is of a different diameter from the main portion, two different chucks, each provided with its set of cutters, may be used, the cutter having the smaller central opening being spaced rearwardly from the first (as indicated in Fig. 4) so as to machine the portion of the neck of reduced diameter. The finishing operations of polishing, etc., such as are well known in the art, may then be resorted to to complete the manufacture of the roll.

My arrangement whereby the cutters are rotated relative to the work-piece, rather than rotating the work-piece relative to the cutters, has the advantage that a large number of cutters may be applied to the work-piece simultaneously. Each cutter removes but a slight amount of metal; but the aggregate amount is considerable. Moreover, the cutting is wide so that an annular zone of metal is removed by a single setting of the tools. The chuck may be rotated at relatively high speed, since the cuttings are so thin that the temperature of the cutting tools will not be, as a result, raised to excessively high temperatures. Since the roll neck is finished substantially to the correct diameter by a single feed of the chuck longitudinally of the neck, the time required for machining the neck is materially reduced.

An important advantage of my invention is the ability to remove metal rapidly without at any time making a deep cut such as is necessary in the machining operation known as "hogging". In other words, although the cuttings are wide and a large number of cutters operate simultaneously, at no time is the depth of cut sufficient to destroy the underlying structure of the metal. When a deep gouge is made, as is true of hogging, the fibers in the underlying structure of the metal are broken up. In contrast to this, the thin cuttings removed in accordance with my invention do not damage or destroy the continuity of the fibrous structure of the metal.

The expense of operating a heavy lathe, the cost of the space in the shop occupied by this large and heavy machinery, as well as the expense incident to maintaining such machinery, all are proportional to the time expended in the machining operations. The time saved by my improved process, therefore, results in a very substantial saving in the cost of machining the neck or similar part of a work-piece.

While I have described in detail the preferred embodiments of my invention, and the preferred steps of the process for machining the necks or similar parts of work-pieces, it is to be understood that the invention is not so limited, but may be otherwise embodied and practiced within the scope of the following claims.

I claim:

1. In apparatus for machining roll necks, a sleeve, a plurality of cutters carried thereby with the principal cutting edge of each cutter approximately in a plane normal to the axis of the sleeve, means for rotating said sleeve, a spindle for engaging the end of a work-piece, a hollow screw surrounding said spindle, positive means for positioning said spindle and screw, and means cooperating with said screw for feeding said cutter carrying sleeve relative to the work-piece.

2. The combination claimed in claim 1 in which the spindle is adjustable toward and from the work-piece.

3. In apparatus for machining roll necks, a sleeve, means for supporting and rotating said sleeve, a plurality of cutters carried by said sleeve with the principal cutting edge of each cutter generally radially disposed, an abutment extending through the sleeve for engaging the end of a work-piece, a hollow screw surrounding said abutment, and means for feeding said cutter carrying sleeve relative to the work-piece including a nut threaded on said hollow screw.

4. The combination claimed in claim 3 in which the means for feeding the cutter carrying sleeve includes a thrust bearing interposed between said sleeve and the nut on the hollow screw, and means for rotating said nut.

BERT A. WILSON.